United States Patent
Khosravy et al.

(10) Patent No.: US 10,139,937 B2
(45) Date of Patent: Nov. 27, 2018

(54) MULTI-MODAL USER EXPRESSIONS AND USER INTENSITY AS INTERACTIONS WITH AN APPLICATION

(71) Applicant: Microsoft Technology Licensing, LLC, Redmond, WA (US)

(72) Inventors: Moe Khosravy, Bellevue, WA (US); Duncan Lawler, Bothell, WA (US); Pasquale DeMaio, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 13/707,726

(22) Filed: Dec. 7, 2012

(65) Prior Publication Data

US 2014/0104197 A1    Apr. 17, 2014

Related U.S. Application Data

(60) Provisional application No. 61/713,438, filed on Oct. 12, 2012.

(51) Int. Cl.
*G06F 3/041*    (2006.01)
*G06F 3/048*    (2013.01)
(Continued)

(52) U.S. Cl.
CPC ......... *G06F 3/041* (2013.01); *G01C 21/3626* (2013.01); *G01C 21/3664* (2013.01);
(Continued)

(58) Field of Classification Search
USPC ................................................ 345/156–184
See application file for complete search history.

(56) References Cited

U.S. PATENT DOCUMENTS

2006/0022955 A1    2/2006  Kennedy
2006/0026535 A1*   2/2006  Hotelling et al. ............ 715/863
(Continued)

FOREIGN PATENT DOCUMENTS

CN    101198925 A    6/2008
CN    101799737 A    8/2010
(Continued)

OTHER PUBLICATIONS

Richard Marsden, "Using Microsoft MapCruncher with Google Maps", retrieved at <<http://www.geowebguru.com/articles/275-using-microsoft-mapcruncher-with-google-maps>>, May 31, 2010, last accessed Oct. 15, 2012, 4 pages.
(Continued)

*Primary Examiner* — Chanh Nguyen
*Assistant Examiner* — Nguyen H Truong (57) ABSTRACT

Architecture that enables single and multi-modal interaction with computing devices, as well as interpreting user intensity (or liveliness) in the gesture or gestures. In a geospatial implementation, a multi-touch interaction can involve the detection and processing of tactile pressure (touch sensitive) to facilitate general navigation between two geographical points. This is further coupled with providing detailed information that facilitates navigation and turn-by-turn directions. This includes the use of time and/or pressure to release or increase the zoom level of map tiles, the touching of the two geographical points and speaking to obtain directions between these two geographical points, and the blending of tiles to create a compelling user experience, where the map is in different levels of zoom on the same view.

20 Claims, 10 Drawing Sheets

(51) Int. Cl.
  *G06F 3/0488*  (2013.01)
  *G01C 21/36*   (2006.01)
  *G06F 3/16*    (2006.01)
  *G09B 29/00*   (2006.01)

(52) U.S. Cl.
  CPC .............. *G06F 3/0488* (2013.01); *G06F 3/16* (2013.01); *G09B 29/00* (2013.01); *G06F 2203/0381* (2013.01); *G06F 2203/04806* (2013.01)

(56) References Cited

U.S. PATENT DOCUMENTS

| | | | |
|---|---|---|---|
| 2006/0047386 A1* | 3/2006 | Kanevsky | B60K 35/00 701/36 |
| 2006/0284858 A1* | 12/2006 | Rekimoto | G06F 3/033 345/173 |
| 2007/0097151 A1 | 5/2007 | Rosenberg | |
| 2008/0059904 A1 | 3/2008 | Abbey et al. | |
| 2009/0058828 A1* | 3/2009 | Jiang | G06F 3/0416 345/173 |
| 2009/0295830 A1 | 12/2009 | Muraveynyk et al. | |
| 2010/0241431 A1* | 9/2010 | Weng et al. | 704/257 |
| 2010/0259500 A1* | 10/2010 | Kennedy | 345/173 |
| 2011/0141115 A1 | 6/2011 | Brandes et al. | |
| 2011/0224896 A1* | 9/2011 | Napieraj | 701/200 |
| 2011/0316854 A1 | 12/2011 | Vandrovec | |
| 2012/0226977 A1* | 9/2012 | Lengeling et al. | 715/702 |
| 2012/0268408 A1* | 10/2012 | Chen et al. | 345/173 |
| 2012/0308204 A1* | 12/2012 | Hwang | 386/241 |
| 2013/0030699 A1* | 1/2013 | Barnes | G01C 21/3679 701/455 |
| 2013/0042180 A1* | 2/2013 | Sai | G09B 21/006 715/729 |
| 2013/0147846 A1* | 6/2013 | Kalai et al. | 345/660 |

FOREIGN PATENT DOCUMENTS

| | | |
|---|---|---|
| CN | 101855521 A | 10/2010 |
| CN | 102428440 A | 4/2012 |
| DE | 102008051756 A1 | 5/2009 |
| JP | H07-280577 | 10/1995 |
| JP | 2002340601 A | 11/2002 |
| JP | 2005107871 A | 4/2005 |
| JP | 2008181523 A | 8/2008 |
| JP | 2008225465 A | 9/2008 |
| JP | 2012042447 A | 3/2012 |
| TW | 200610419 A | 3/2006 |
| WO | 2005/111930 A2 | 11/2005 |
| WO | 2011082645 A1 | 7/2011 |

OTHER PUBLICATIONS

Ho Pui Yu, "zMap", retrieved at <<https://itunes.apple.com/us/app/zmap/id504320381?mt=8>>, Last Updated Sep. 5, 2012, last accessed Oct. 15, 2012, 3 pages.

Kratz et al., "Semi-Automatic Zooming for Mobile Map Navigation", In Proceedings of the 12th International Conference on Human Computer Interaction With Mobile Devices and Services, Sep. 7, 2010, 9 pages.

Lu et al., "Gesture Coder—A Tool for Programming Multi-Touch Gestures by Demonstration", SIGCHI conference on in Proceedings of Human Factors In Computing Systems, May 5, 2012, 10 pages.

Krum et al., "Situational Visualization", In Proceedings of ACM Symposium on Virtual Reality Software and Technology, Nov. 15, 2001, 8 pages.

Xinlin et al., "Multi-Representation Geographic Data Organization Method Dedicated for Vector-Based WebGIS", The International Archives of the Photogrammetry, Remote Sensing and Spatial Information Sciences, Jul. 3, 2008, 4 pages, vol. XXXVII, Part B4, Beijing.

"International Search Report & Written Opinion for PCT Patent Application No. PCT/US2013/064734", dated Apr. 1, 2014, Filed Date: Oct. 12, 2013, 16 Pages.

PCT 2nd Written Opinion in International Application PCT/US2013/064734, dated Oct. 6, 2014, 12 pgs.

Chinese First Office Action in Application 201380053225.7, dated Apr 18, 2017, 18 pages.

"Office Action Issued in Japanese Patent Application No. 2015-536974", dated May 24, 2017, 8 Pages.

"Second Office Action and Search Report Issued in Chinese Patent Application No. 201380053225.7", dated Dec. 15, 2017, 17 Pages.

Japanese Final Notice of Rejection in Application 2015-536974, dated Oct. 18, 2017, 7 pages.

"Third Office Action and Search Report Issued in Chinese Patent Application No. 201380053225.7", dated Jul. 2, 2018, 15 Pages.

* cited by examiner

ZOOM GESTURES – INCREASE / DECREASE DISTANCE BETWEEN HANDS TO CHANGE BLEND RATE

MULTI-MODAL USER EXPRESSIONS AND USER INTENSITY AS INTERACTIONS WITH AN APPLICATION

CROSS-REFERENCE TO RELATED APPLICATIONS

This application claims the benefit of U.S. Provisional Patent Application Ser. No. 61/713,438, entitled "MULTI-MODAL USER EXPRESSIONS AND USER INTENSITY AS INTERACTIONS WITH AN APPLICATION", and filed on Oct. 12, 2012.

BACKGROUND

In the computing world, users are becoming more sophisticated in the ways of device interaction. The foundational techniques of computer interaction are the keyboard, the mouse, followed by light pens, touch screens, etc. In more sophisticated systems such as computer game systems, for example, interaction systems are now being offered that recognize voice and natural user actions. However, these existing more advanced capabilities are still in infancy and not fully utilized in many hardware and software systems.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables single and multi-modal user expressions (e.g., gestures, speech, etc.) as interaction with computing devices. Furthermore, these expressions can be analyzed to determine user intensity (or liveliness) in the expression(s). An expression can comprise a single or multiple user actions (e.g., a facial expression plus a hand motion, a hand motion plus speech, etc.). For example, in a geospatial implementation, a multi-touch interaction can involve the detection and processing of tactile pressure (sensitive touch) relative to two geographical points of a map (navigation) application to facilitate general navigation between the two points. This is further coupled with providing detailed information that facilitates navigation and turn-by-turn directions.

Continuing with the geospatial application implementation, time can be tracked in combination with an expression of tactile pressure to release or increase the zoom level of geographical map tiles (where the map is in different levels of zoom on the same view), the touching of two geographical points and speaking to obtain directions between these two points, and the blending of map tiles, all of which can be realized to create a compelling user experience.

A modal input expression includes, but is not limited to, user gesture(s) (e.g., facial expression, body appendage and body movements, speech, etc.), which can be sensed and interpreted as including user intensity, such as an accelerated motion by a hand, an increasing amount or rate of tactile pressure on a touch screen, a sustained tactile pressure (pressure dwell) on a tactile pressure sensing system, increased/decreased speech volume and/or speaking speed (generally, gesture speed), and facial gestures that are recognized as showing surprise, shock, happiness, etc., for example.

The architecture operates using any combination of system interaction, expressions, rendering, and optionally, user intensity. In the geospatial implementation where map tiles are employed, for example, as zoom levels increase or decrease (e.g., via voice, via touch, via pressure on a pressure sensitive tablet, etc.) the surrounding area is presented in varying resolutions of data to create a finer level of detail tiling that shows increased or decreased zoom levels. Expressions such as gestures can be employed to affect zoom blend rates, and quad tree based tessellation (gradual visual seamless transition of some or all of the interstitial spaces of two or more geographical regions of different resolutions) and rendering with transparent and blur overlays to cover hard edges and gaps (e.g., across affected map areas). The map tiles of differing sizes are blended to provide a more appealing user experience.

The architecture also provides accelerated views by blurring the path curves between the start and end points, which is suitable for situations where performance and/or network connectivity may be reduced (or limited) such that only the zoom levels close to the points of interest are fetched.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables single and multi-modal (e.g., multi-input) user expressions as interactions with computing devices. Alternatively, or in addition thereto, user intensity (or liveliness) of one or more expressions can be computed as part of the interaction to cause other device/application operations. The single and multi-modal expressions (inputs to the device, application, system) include any single or combination of speech, gestures, and touch to enable faster and a more optimized user experience for the interactions with computing devices (e.g., cell phones, tablets, computers, etc.). For example, in a maps and navigation application, being able to ascertain the directions between two geographical points by touching on the points obviates several mouse clicks. Speech can be utilized as an added gesture to disambiguate any confusion of the hardware/software that may be introduced in the multi-modal gesture environment.

In the existing geospatial paradigms, a challenge has been the attempt to display a user experience where all map tiles are at the same zoom level. The disclosed architecture operates using a combination of system interactions, expressions, and rendering. In the geospatial implementation where tiles are employed, for example, as zoom levels increase or decrease (e.g., via voice, via touch, via pressure on a pressure sensitive tablet, etc.) the surrounding map areas can be tessellated to create a finer level of detailed tiling that shows increased or decreased zoom levels.

Expressions (e.g., voice, hand, body, pose, eye, facial, etc.), such as gestures, can be employed to affect zoom blend rates and quad tree based tessellation and rendering with transparent and blur overlays to cover hard edges and gaps across the affected areas. (A quad tree is a treelike data structure where each node has up to four child nodes, and is most often used to partition a two-dimensional space by subdividing it recursively.)

The architecture also provides accelerated views by blurring the path curves between the start and end position, which is suitable for situations where performance and/or network connectivity are low such that only the zoom levels close to the points of interest are fetched.

With respect to pressure variations such as tactile pressure on a touch-sensitive display (or screen) or other type of surface, multiple pressure thresholds can be configured to not only sense different levels of pressure applied, and dwell (e.g., time per single tactile contact, time per each level of pressure applied), but also rates at which the pressure is applied. For example, user intensity can be computed as related to the rate of applied pressure. If the user applies tactile pressure at an increasing rate (an accelerated pressure increase versus a static or constant pressure), it can be computed that the user intensity is high, and thus, a corresponding level of urgency is determined and that a hardware/software action can be expedited (e.g., by allocating a corresponding amount of processing and other resources).

Pressure sensing and detection can be computed as a function of dwell. Dwell is the amount of time expended for a given user action. That is, if the user applies continuous pressure (a constant pressure value) for a predetermined time (e.g., one second, three second, etc.), the pressure action can be interpreted differently than a pressure interaction that is applied for three seconds. Similarly, if the user applies tactile pressure at an increasing rate (an accelerated pressure increase versus a static pressure), it can be computed that the user intensity is high, and thus, a corresponding level of urgency is determined and that a corresponding amount of processing and other resources are devoted to enable the associated hardware/software performed the desired action expeditiously.

An expression of voice and speech can be sensed and detected for one or more interactions, and analyzed for user intensity based on volume (loudness), change in volume, speed of speech, pitch of voice (e.g., high, low) as levels of stress, shortness of vocal tones, sustained vocal tones, and so on. Mouthed output such as grunts, groans, moans, etc., can also be configured for the desired interactive affect.

Expressions as hand motions and digit (finger) counts can be sensed and detected as one or more interactions for application control, and analyzed for user intensity. For example, a flick of a hand can be representative of a paging between documents or views of the application. An accelerated flick (an inertia motion or expression) can signify user intensity to accelerate the paging operation.

Expressions as facial expressions can be sensed and detected for one or more interactions, and analyzed for user intensity based on an expression that translates to surprise, sadness, etc.

Expressions can be inferred based on sensed and detected body temperature, heart rate, and other biometric parameters as representative of mood and truthfulness, for example, and analyzed for user intensity. For example, if the body temperature and/or heart rate is elevated, it can be inferred that the user intensity is also elevated and interpreted as important. Thus, the application can operate at a more efficient level to complete the interaction.

Expressions can be inferred based on sensed and detected skin color, and analyzed for user intensity. For example, if the facial skin color is sensed as being red, the expression and user intensity can be inferred to be related to stress, increased mental or physical activity, which can then relate to mood. Thus, the interaction can cause the application to operate in a corresponding way.

An expression of body motion such as jumping up and down can be sensed and detected as related to approval or excitement. Thus, the user intensity can be analyzed to translate to an excited emotional level and the interaction can cause the application to operate in a corresponding way.

Eye tracking (movements) such as left, right, up, and down, blinking, winks, dwell (time length of stare or gaze at an item of interest), etc., can be recognized as specific interactions such as agreement or disagreement, for example. Eye tracking can be analyzed for user intensity and interest to translate into an interaction(s) that cause the application to operate in a corresponding way. For example, looking at a specific area of a map without changing a field of view what is visible can be an implicit interaction (gesture). A sustained look, as determined by the eye tracking, can be interpreted by an application to then respond in some way, such as zoom in, zoom out, apply graphical emphasis (e.g., highlight, underline, font change, etc.).

Sensing components such as gyroscopes and accelerometers commonly embedded in phones and other computing devices can be monitored to measure expressions related to shaking/non-shaking, user orientation, rate/acceleration of shaking, rate/acceleration of orientation movement, and so on. Each of these can be analyzed for user intensity to translate into an interaction(s) that cause the application to operate in a corresponding way.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
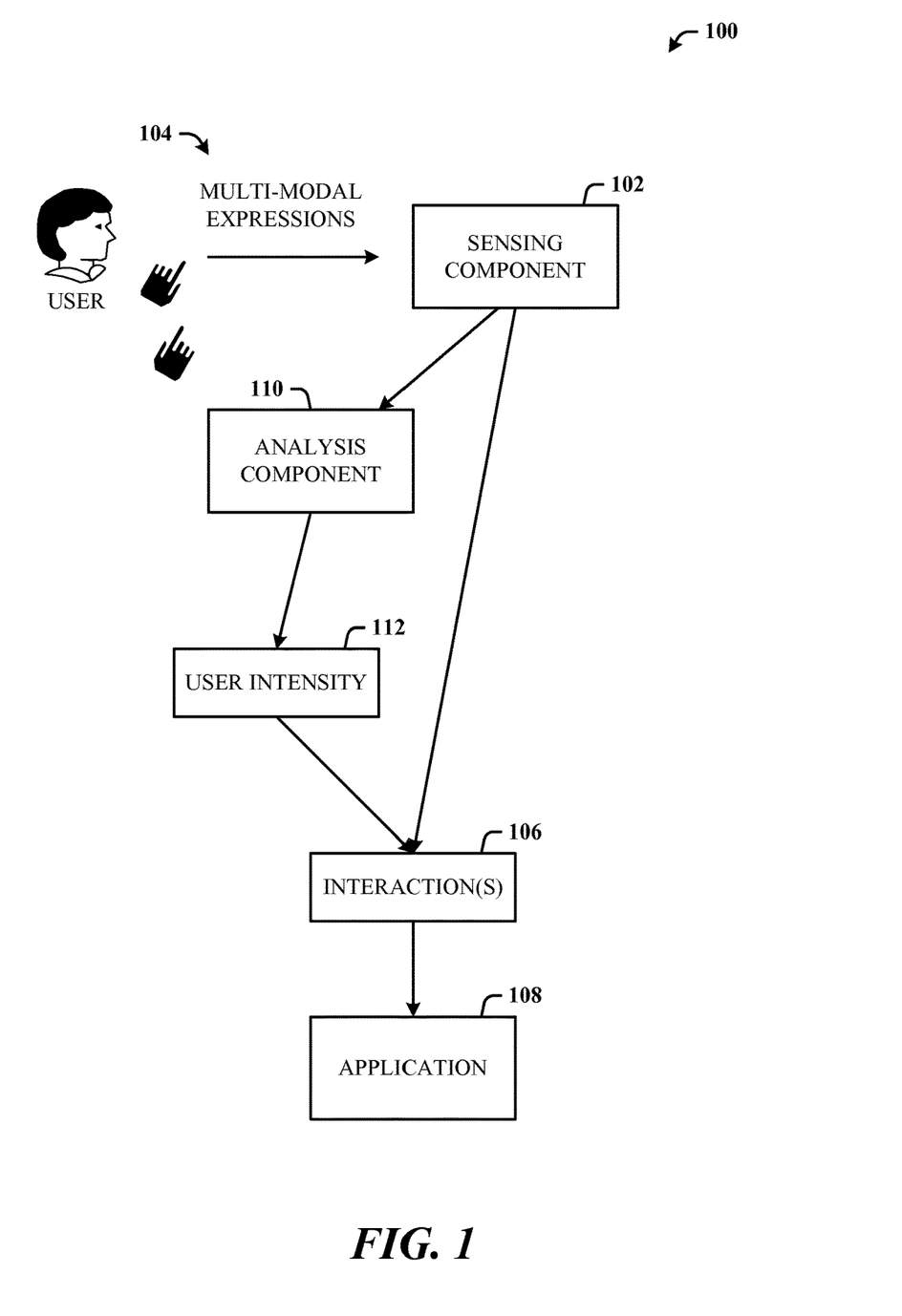
FIG. 1 illustrates a system in accordance with the disclosed architecture.

FIG. 1 illustrates a system 100 in accordance with the disclosed architecture. The system 100 can include a sensing component 102 that senses and interprets multi-modal user expressions 104 as interactions 106 for controlling an application 108. The sensing component 102 includes the sensing subsystems of a device such as camera, microphone, accelerometer, gyroscope, temperature sensor, humidity sensor, geographical location subsystem (e.g., GPS-global positioning system), pressure sensitive surface (e.g., touch screen), other user inputs (e.g., mouse, pen, keyboard, etc.), and others.

The sensing component 102 can output raw data from the subsystems to other onboard components (and/or remote components such as in the "cloud") for data processing, such as for recognition processing of facial expressions, gestures (e.g., natural user interface (NUI)), and so on. Alternatively, the sensing component 102 includes all the capabilities and algorithms to perform, for example, face recognition, facial expression recognition, gesture recognition, voice recognition, speech recognition, and so on, and then outputs data suitable for processing by an analysis component 110 to derive any user intensity 112.

As depicted, some output of the sensing component 102 is passed directly to the application 108 as interactions 106 understood by the application 108. Other output by the sensing component 102 is passed to the analysis component 110, such as images of facial expressions, for analysis to determine if user intensity 112 is present. The application 108 then operates according to the user expressions 106 and/or the user intensity 112.

As previously indicated, the application 108 can be a maps and navigation program accessed by the user to assist in reaching a destination from a starting point. This implementation is described in greater detail herein below.

In other words, one of the user expressions is to touch a touch (pressure) sensitive display, using one or more touches (e.g., a sequence of touches, concurrent touches, etc.), two geographical points (an origin and a destination) on a map application for directions (e.g., graphically or listed) between an origin and a destination. The map application blurs map tiles in a path (tiles) between the origin and the destination while retaining a detailed focus of the origin and the destination. The sensing component senses the user intensity as defined by one or more of the user expressions, and the analysis component analyzes the intensity to cause a zoom-in operation or a zoom-out operation of the application.

The user intensity is defined according to dwell time of a touch on a touch sensitive display and touch pressure of the touch. The application renders different levels of view in a single overall view. The user expression translates to pressure and dwell of the pressure applied to a touch display surface such that a different pressure results in a correspondingly different application operation. The multi-modal user expressions are disambiguated using speech input.

Figure 2:
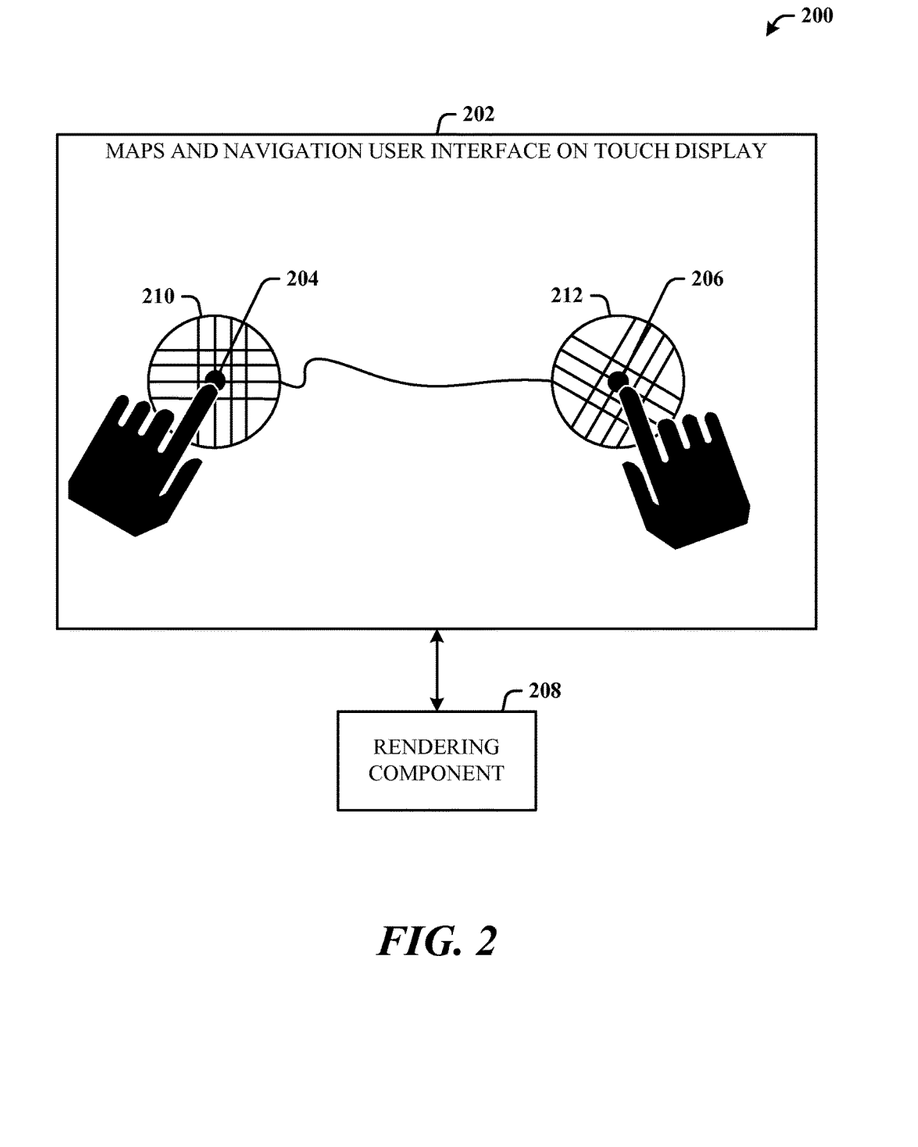
FIG. 2 illustrates a diagram of an implementation of user expressions and differential tile rendering in a maps and navigation application via a touch display.

FIG. 2 illustrates a diagram 200 of an implementation of user expressions and differential tile rendering in a maps and navigation application via a touch display 202. Here, the user interacts multi-modally with the touch display 202 by tactile contact of a left handed finger to a starting point 204 and a right hand finger on a destination point 206. The order of first contact and the second contact can be configured as a directional indication of start to destination, for example.

A rendering component 208 facilitates the rendering of a region 210 around the starting point 204 at a first zoom level and the rendering of a region 212 around the destination point 206 at a second zoom level. The zoom levels can be the same or different. Thus, the view is such that the user can perceive in greater detail the map details in the regions (210 and 212), thereby providing multiple levels of detail in a single map view where all tiles are included.

The user can change the level of zoom in each of the regions (210 and 212) based on tactile pressure. This change can further be facilitated by the dwell associated with the tactile pressure. Still further, the change can be facilitated by any detection of user intensity.

Figure 3:
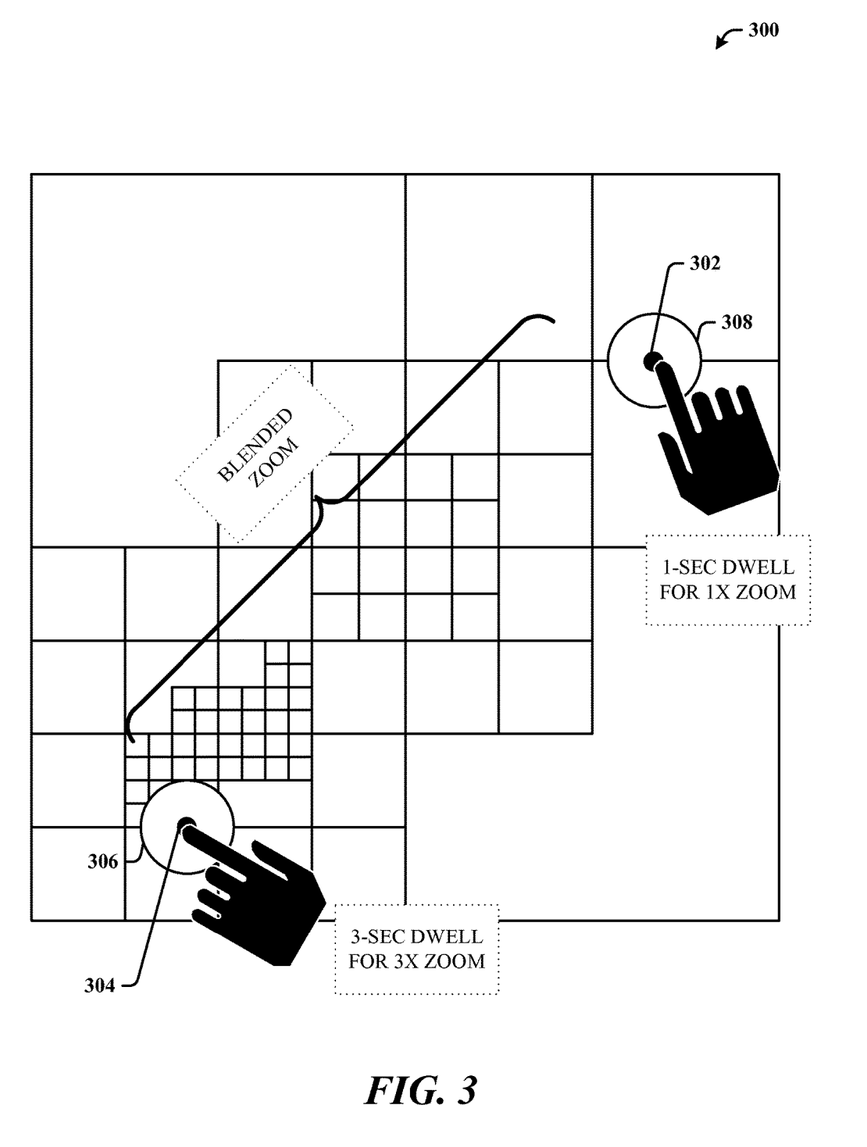
FIG. 3 illustrates a diagram of a level-of-detail logical view for representing zoom levels with recursive divisions to fetch zoom levels.

FIG. 3 illustrates a diagram 300 of a level-of-detail logical view for representing zoom levels with recursive divisions to fetch zoom levels. Here, using a quad tree based blending of tiles, a starting point 302 is touched using a right hand finger and a destination point 304 using a left hand finger. A region 306 around the destination point 304 can be rendered at a greater zoom level (e.g., 3×) by holding the touch pressure constant for a longer time than the touch pressure at the starting point 302 (and region 308), which based on a reduced dwell (and/or a reduced tactile pressure) is rendered at a lower zoom (e.g., 1×) and thus less map detail, since the user may typically know how to navigate away from the starting point 302, but need more details when arriving at the destination point 304. Thus, in one implementation, longer holds or increased pressure produce a higher zoom and tiles are fetched according to the created zoom map level and based on the navigation path. The path between the points (302 and 304) can then be tessellated (blurred) as a blended zoom.

In an alternative embodiment, the onboard geolocation system can be tracking the user progress from the starting point 302 to the destination point 304, and facilitate rendering of a zoom bubble that moves along the path between the points (302 and 304) based on the geolocation of the user.

When employing user intensity, if user intensity is detected, in one example, the user intensity can cause auto-zoom levels to appear in one or both of the point regions based on detected stress.

Figure 4:
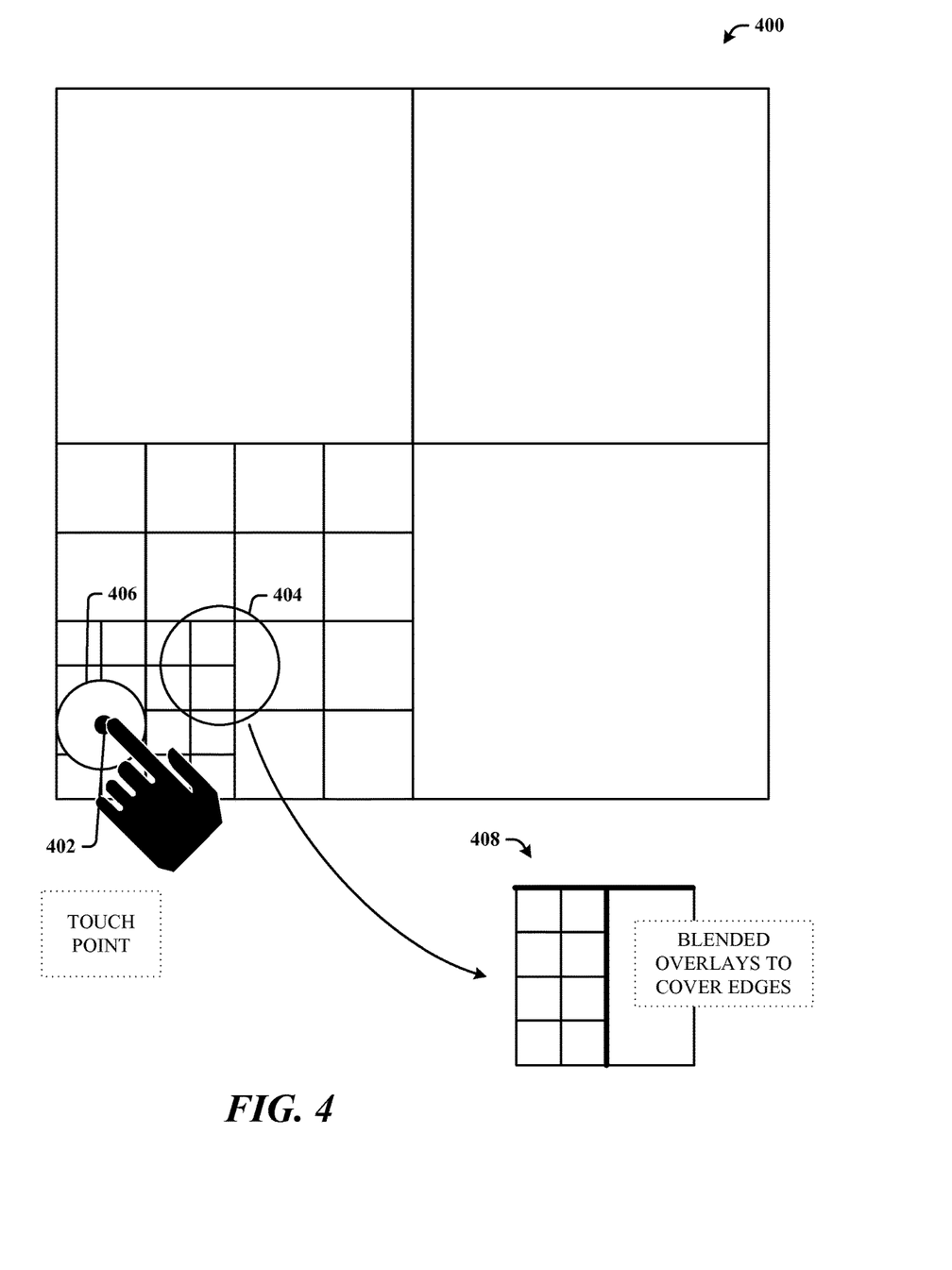
FIG. 4 illustrates a diagram of a logical view of map tiling for edge rendering.

FIG. 4 illustrates a diagram 400 of a logical view of map tiling for edge rendering. At a touch point 402, an area 404 proximate a region 406 of the touch point 402 shows how a quad tree is being hinted to fetch different zoom levels that gradually get to the level of detail at the touch point 402. Hard edges can be smoothed over using blurring and transparency to address seams in the map as zoom levels change, as represented at 408.

Figure 5:
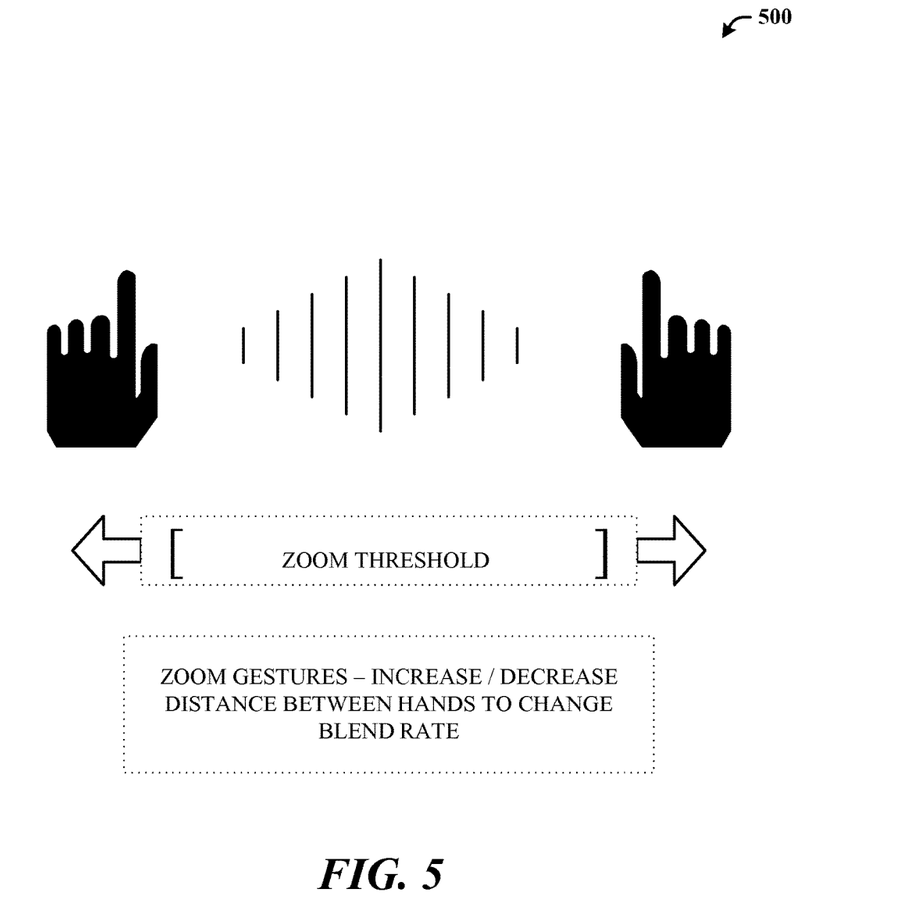
FIG. 5 illustrates a diagram where gestures are employed affect the global zoom by way of pinching in and pinching out.

FIG. 5 illustrates a diagram 500 where gestures are employed affect the global zoom by way of pinching in and pinching out. Here, the user expression is represented as using both hands (with or without tactile contact) to change the zoom, and hence, the associated blend rate. The rendering component 208 can utilize the same technique over the produced curve to create the visualization.

Figure 6:
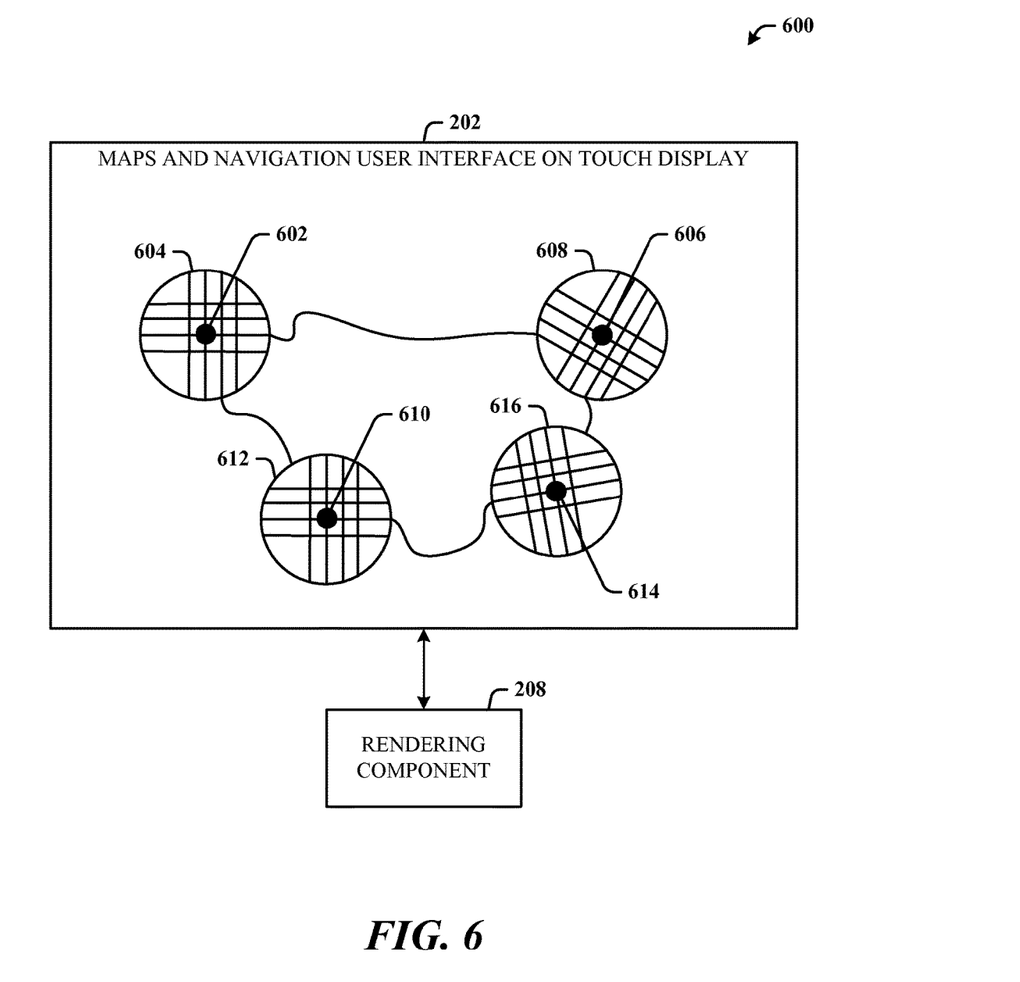
FIG. 6 illustrates an alternative implementation where geospatial search results are each rendered with an increased zoom level on the map.

FIG. 6 illustrates an alternative implementation where geospatial search results are each rendered with an increased zoom level on the map. Here, four geographical points of interest are presented, each with its own zoom level: a first point 602 and first region 604, a second point 606 and second region 608, a third point 610 and third region 612, and a fourth point 614 and fourth region 616. The user expression can be detected as eye gaze to any single point or eye tracking between any two points, to cause automatic adjustment of the zoom levels for those points.

Figure 7:
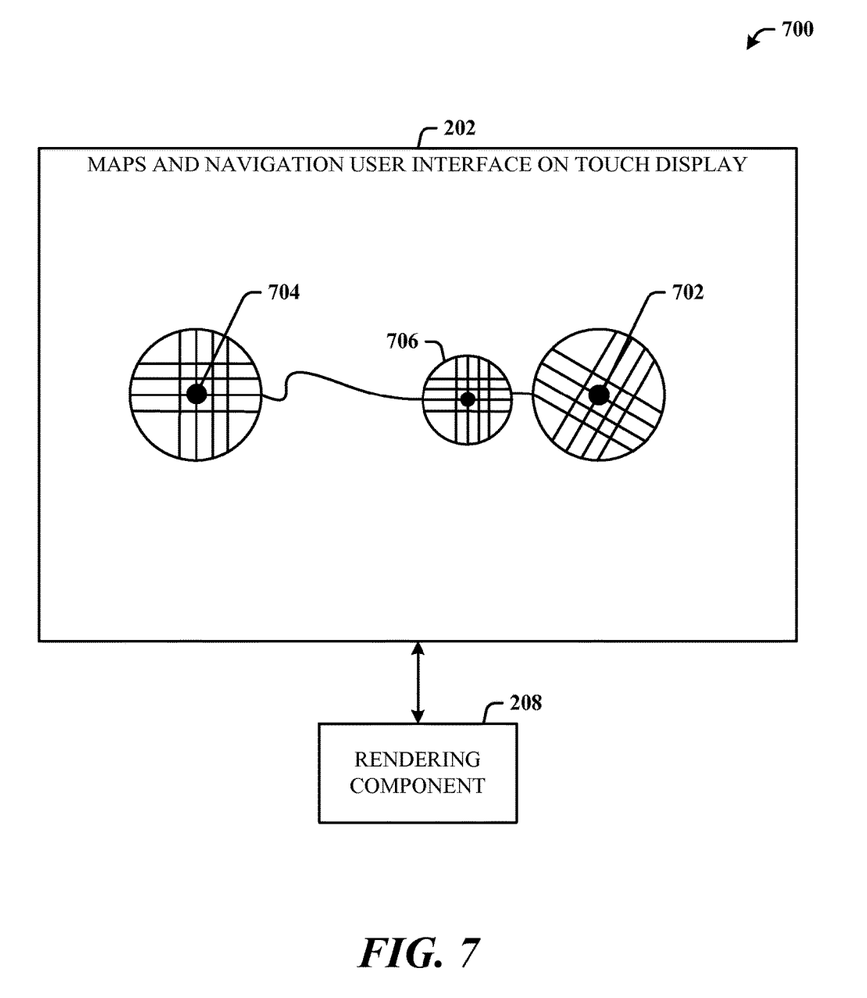
FIG. 7 illustrates a diagram that depicts the use of fish-eye regions for more detailed views proximate a starting point and any subsequent turns on the way to a destination point.

FIG. 7 illustrates a diagram 700 that depicts the use of fish-eye regions for more detailed views proximate a starting point 702 and any subsequent turns on the way to a destination point 704. A fish-eye region 706 is rendered and updated as tracking the user location as the user traverses the path from the starting point 702 to the destination point 704.

A natural user interface (NUI) may be used as part of the disclosed architecture. A NUI may be defined as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of applicable NUI technologies include touch sensitive displays, voice and speech recognition, intention and goal understanding, motion gesture detection using depth cameras (such as stereoscopic camera systems, infrared camera systems, RGB (red-green-blue) camera systems, and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalogram (EEG) and related methods).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
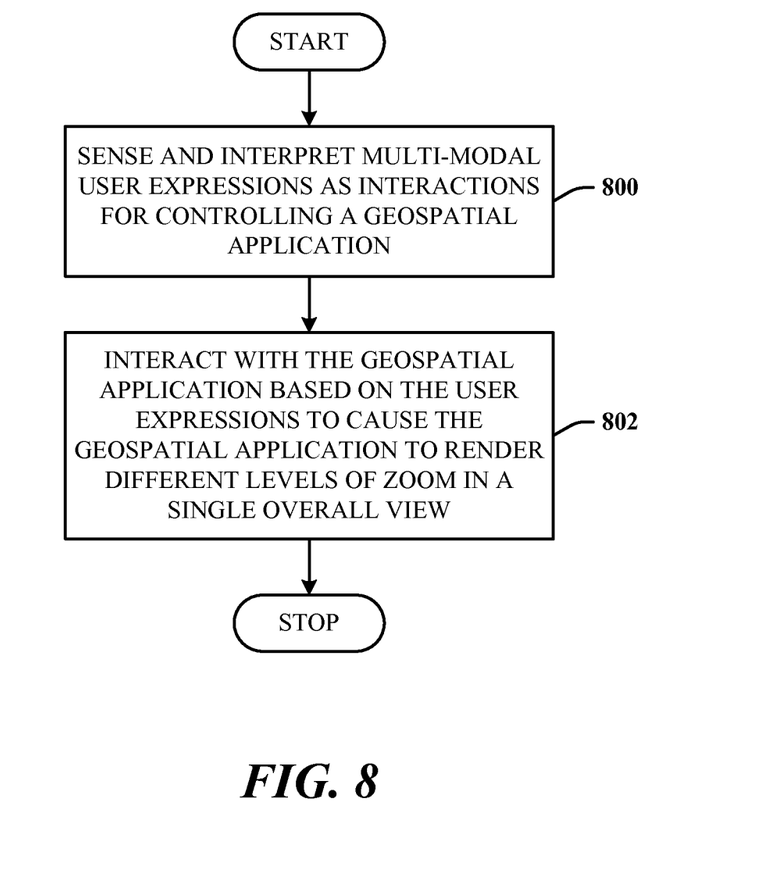
FIG. 8 illustrates a method in accordance with the disclosed architecture.

FIG. 8 illustrates a method in accordance with the disclosed architecture. At 800, multi-modal user expressions are sensed and interpreted as interactions for controlling a geospatial application. At 802, the geospatial application is interacted with based on the user expressions to cause the geospatial application to render different levels of zoom in a single overall view. The method can further comprise an act of analyzing the user expressions to detect user intensity, and interacting with the geospatial application based on the user expressions and the user intensity to cause the geospatial application to render the different levels of zoom in the single view.

The method can further comprise an act of analyzing the user expressions to detect user intensity, and interacting with the geospatial application based on the user expressions and the user intensity to cause the geospatial application to render the different levels of zoom in the single overall view. The method can further comprise an act of blurring map tiles in a path (routes) between a geographical origin and a geographical destination while retaining a detailed focus the origin and the destination.

The method can further comprise an act of only fetching zoom levels associated with geographical points of interest (e.g., origin and destination) of a map. However, it can be the case where three or more points of interest on the map are selected by touch, in which case, the zooms levels are greater at these points of interest than anywhere else on the map. The level of zoom at the points of interest can be at least down to the street level or at the levels provided within the capabilities of the application.

The method can further comprise an act of interacting with the geospatial application using multiple touches on a pressure sensitive display to identify and present directions between a geographical origin and a destination. The touches can be sequentially on different points of interest, which operates on the first two points touched. Alternatively, the touches can be made concurrently using two fingers of the same hand, or fingers of different hands, etc.

The method can further comprise an act of enabling different zoom levels on a geographical point of interest in response to corresponding variations in touch pressure and touch dwell time. The touch pressure can be configured/calibrated to pressure thresholds such that a first pressure causes a first application operation to occur, a second and greater pressure causes a second application operation to occur, and still a third and greater pressure (than the second pressure) causes a third application operation to occur, and so on. Touch dwell separately or in combination with touch pressure can also be used. In other words, if the touch pressure at a point of interest is sustained for a predetermined time (e.g., one second), the application will respond in a correspondingly certain way (e.g., increase the zoom level).

The method can further comprise an act of touching a geographical origin and a geographical destination on a map of the geospatial application and providing voice input (e.g., commands) to obtain directions between the origin and the destination. The method can further comprise an act of rendering an increased level of detail for a geographical origin and a geographical destination, and concurrently, a reduced level of detail everywhere else in a map of the geospatial application.

Figure 9:
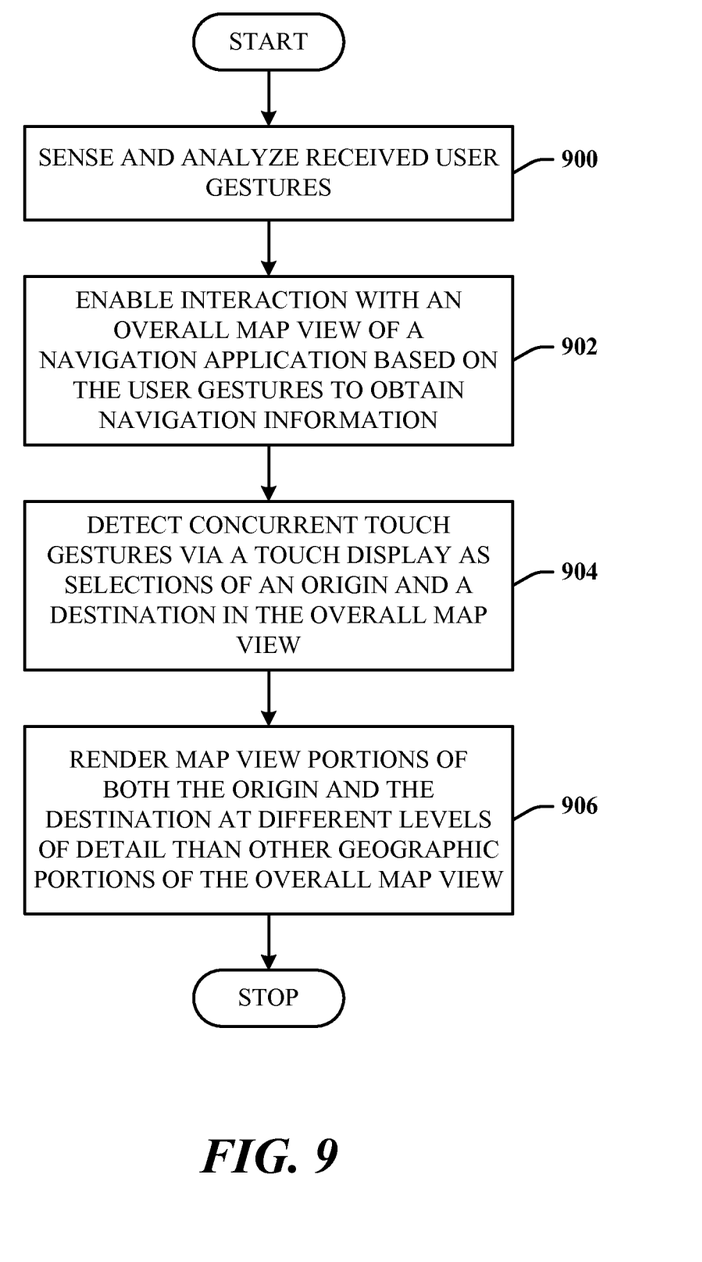
FIG. 9 illustrates an alternative method in accordance with the disclosed architecture.

FIG. 9 illustrates an alternative method in accordance with the disclosed architecture. At 900, user gestures are sensed and analyzed. At 902, interaction with an overall map view of a navigation application is enabled based on the user gestures to obtain navigation information. At 904, concurrent gestures are detected via a touch display as selections of an origin and a destination in the overall map view. At 906, map view portions of both the origin and the destination are rendered at different levels of detail than other geographic portions of the overall map view.

The method can further comprise acts of enabling the different levels of detail of map tiles in response to touch pressure variations, and/or enabling the different levels of detail of map tiles in response to touch dwell. The method can further comprise acts of concurrently touching the origin and the destination, and speaking, to cause the navigation application to return directions from the origin to the destination.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
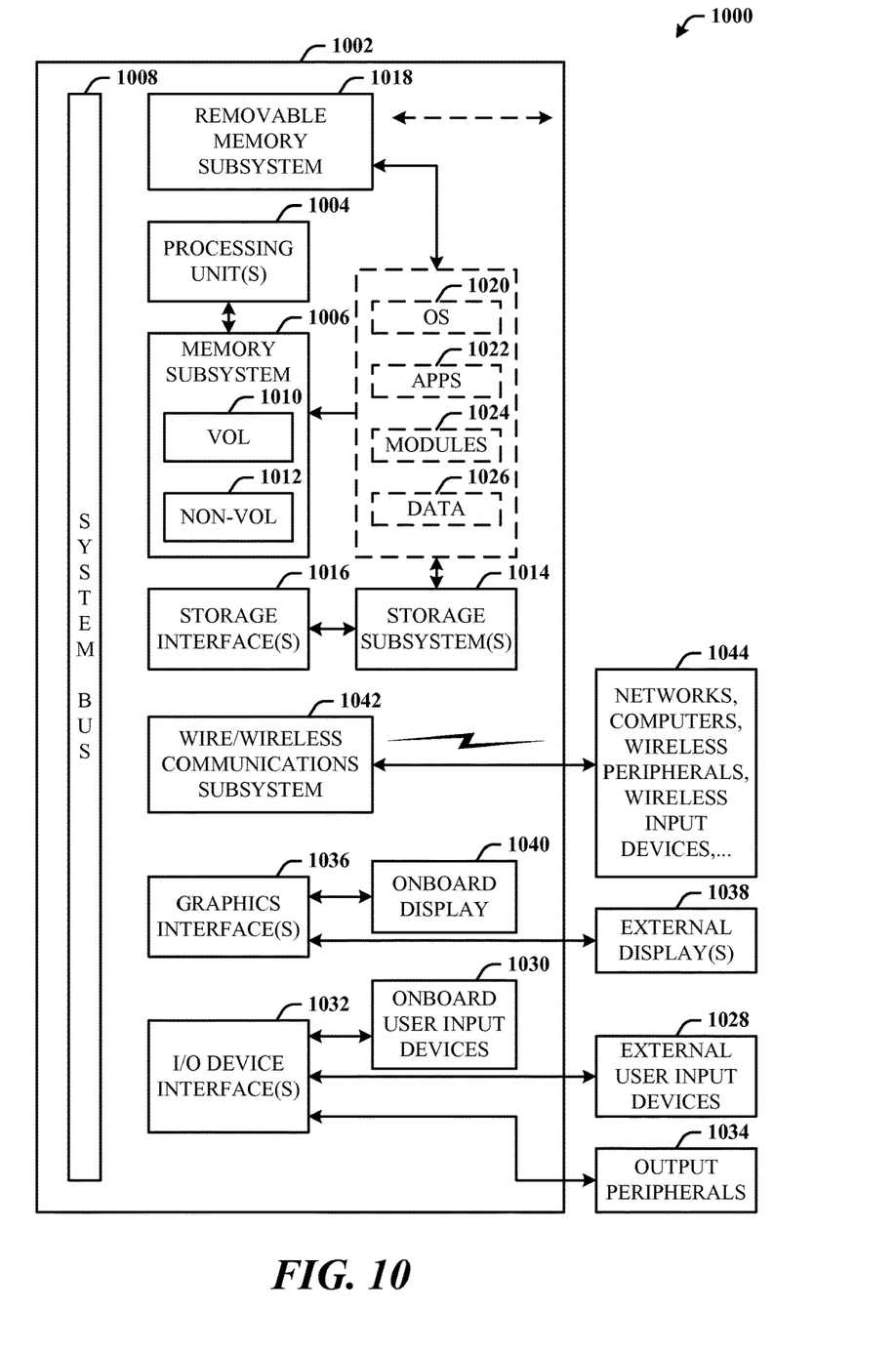
FIG. 10 illustrates a block diagram of a computing system that executes multi-modal user expressions for application interaction with user intensity in accordance with the disclosed architecture.

Referring now to FIG. 10, there is illustrated a block diagram of a computing system 1000 that executes multi-modal user expressions (gestures) for application interaction in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004 (also referred to as microprocessor(s) and processor(s)), a computer-readable storage medium such as a system memory 1006 (computer readable storage medium/media also include magnetic disks, optical disks, solid state drives, external memory systems, and flash memory drives), and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1002 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1006 can include computer-readable storage (physical storage) medium such as a volatile (VOL) memory 1010 (e.g., random access memory (RAM)) and a non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include entities and components of the system 100 of FIG. 1, entities and components of the system 200 of FIG. 2, entities and components of the diagram 300 of FIG. 3, entities and components of the diagram 400 of FIG. 4, entities and components of the diagram 500 of FIG. 5, the alternative implementation of FIG. 6, entities and components of the diagram 700 of FIG. 7, and the methods represented by the flowchart of FIGS. 8 and 9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 1002, and includes volatile and non-volatile internal and/or external media that is removable and/or non-removable. For the computer 1002, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1002, programs, and data using external user input devices 1028 such as a keyboard and a mouse, as well as by voice commands facilitated by speech recognition. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example.

These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
    a pressure-sensitive display;
    at least one processor; and
    a memory coupled to the at least one processor and storing instructions that, when executed by the at least one processor, performs a method, comprising:
    detecting multi-touch input provided on the pressure-sensitive display to determine a first geographical point in a mapping application and a second geographical point in the mapping application;
    analyzing an intensity of the detected multi-touch input at the first geographical point and the second geographical point to determine a first zoom level and a first zoom rate for the first geographical point and a second zoom level and a second zoom rate for the second geographical point, wherein the first zoom level is associated with a first level of detail of the first geographical point and the second zoom level is associated with a second level of detail of the second geographical point;
    displaying, on the pressure-sensitive display, the first geographical point at the first zoom level concurrently with the second geographic point at the second zoom level, wherein the first geographical point is zoomed in to the first zoom level using the first zoom rate and the second geographic point is zoomed in to the second zoom level using the second zoom rate; and
    displaying a path between the first geographical point and the second geographical point, wherein the path is blurred as a blended zoom that changes based, at least in part, on the intensity of the detected multi-touch input at the first geographical point and the second geographical point.

2. The system of claim 1, wherein the multi-touch input associated with the first geographical point and the second geographical point causes directions from the first geographical point to the second geographic point to be output on the pressure-sensitive display.

3. The system of claim 1, wherein a first intensity is associated with a zoom-in operation and a second intensity is associated with a zoom-out operation.

4. The system of claim 1, wherein the intensity is associated with a dwell time of the detected multi-touch input.

5. The system of claim 1, further comprising instructions for analyzing speech input when determining the first zoom level and the second zoom level.

6. A method for controlling a mapping application, comprising:
   receiving a first touch input at a first location on a pressure-sensitive display;
   receiving a second touch input at a second location on the pressure-sensitive display;
   determining an intensity of the first touch input at the first location and an intensity of the second touch input at the second location;
   rendering, on the pressure-sensitive display, different levels of zoom at different zoom rates for the first location concurrently with the second location based, at least in part, on the determined intensity of the first touch input and the second touch input, wherein each of the different levels of zoom provide a different level of detail for the first location and the second location respectively; and
   displaying a path between the first location point and the second location, wherein the path is blurred as a blended zoom that changes based, at least in part, on the intensity of the first touch input and the second touch input.

7. The method of claim 6, further comprising blurring map tiles in a path between the first location and the second location while retaining the different levels of zoom for the first location and the second location.

8. The method of claim 6, further comprising providing directions between the first location and the second location.

9. The method of claim 6, wherein the different levels of zoom for the first location and the different levels of zoom for the second location are associated with a touch dwell time.

10. The method of claim 6, further comprising providing voice input to obtain directions between the first location and the second location.

11. The method of claim 6, further comprising controlling the different levels of zoom based, at least in part, on one or more received gestures associated with the first touch input or the second touch input.

12. The method of claim 6, wherein the path is associated with a route.

13. A computer-readable storage medium encoding computer executable instructions that, when executed by a processor, performs a method for controlling a mapping application, comprising:
   receiving two or more touch inputs on a pressure-sensitive display;
   associating an origin on a map of the mapping application with a first touch input of the two or more touch inputs;
   associating a destination on the map of the mapping application with a second touch input of the two or more touch inputs;
   sensing an intensity of each of the two or more touch inputs;
   rendering the origin at a first level of detail and at a first zoom rate based on the intensity of a first one of the two or more touch inputs;
   rendering the destination at a second level of detail and at a second zoom rate based on the intensity of a second one of the two or more touch inputs; and
   displaying a path between the origin and the destination, wherein the path is blurred as a blended zoom that changes based, at least in part, on the intensity of the first one of the two or more touch inputs at the origin and the second one of the two or more touch inputs at the destination.

14. The computer-readable medium of claim 13, further comprising instructions for enabling different map tiles to have different zoom levels in response to the intensity of the two or more touch inputs.

15. The computer-readable medium of claim 13, further comprising instructions for determining the different levels of detail based, at least in part, on a touch dwell.

16. The computer-readable medium of claim 13, further comprising instructions for returning directions from the origin to the destination based on voice input.

17. The computer-readable storage medium of claim 13, further comprising instructions for zooming out from the origin or the destination based on a first amount of intensity and zooming in on the origin or the destination based on a second amount of intensity.

18. The computer-readable storage medium of claim 13, further comprising instructions for zooming out from the origin or the destination based on a first gesture and zooming in on the origin or the destination based on a second gesture.

19. The computer-readable storage medium of claim 13, further comprising instructions for:
   receiving a third touch input on the pressure sensitive display;
   associating the third touch input with a geographic region; and
   rendering the geographic region associated with the third touch input at a different level of detail than other geographic portions displayed on the mapping application.

20. The computer-readable storage medium of claim 19, wherein the different level of detail associated with the geographic region is based, at least in part, on one of an intensity of the third touch input and a gesture associated with the third touch input.

* * * * *